H. ANSCHUTZ-KAEMPFE.
ARTIFICIAL HORIZON.
APPLICATION FILED FEB. 27, 1914.
1,141,099.
Patented June 1, 1915.
2 SHEETS—SHEET 1.
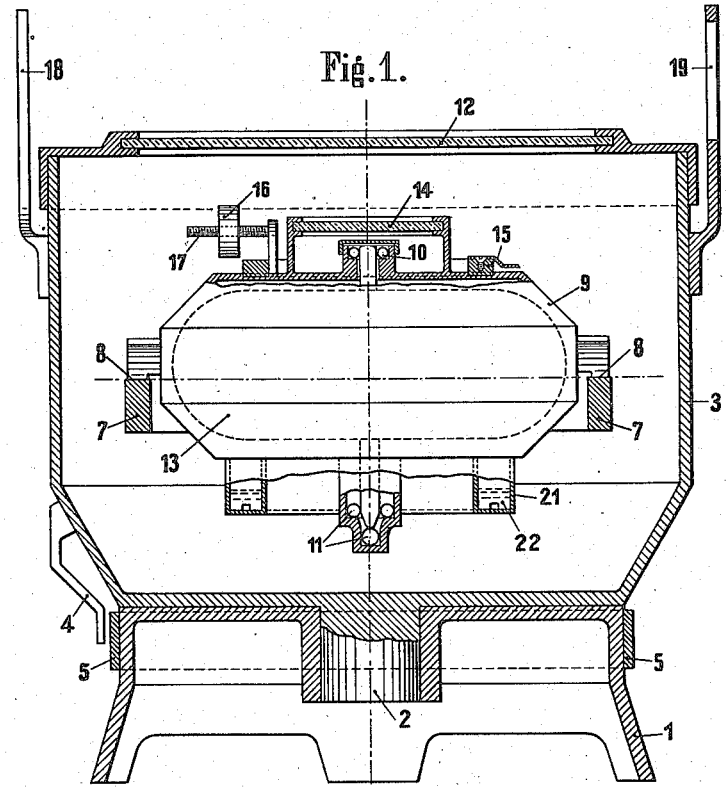
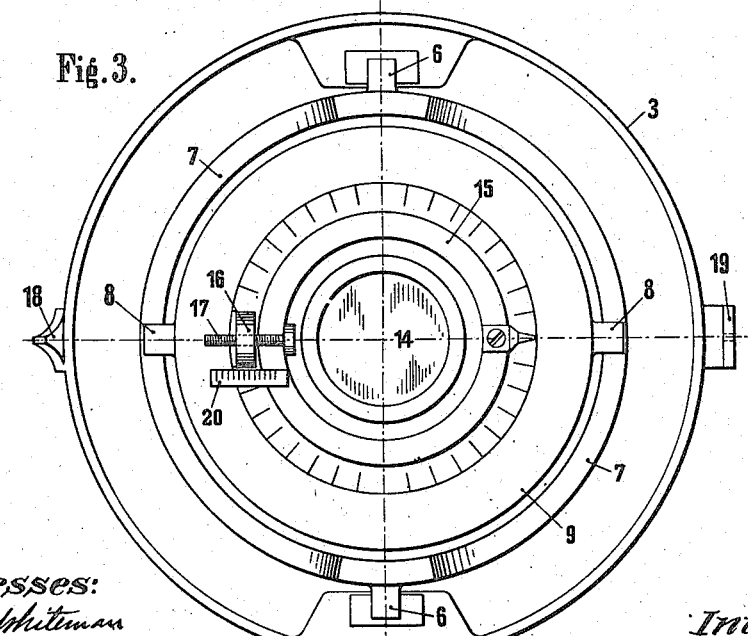

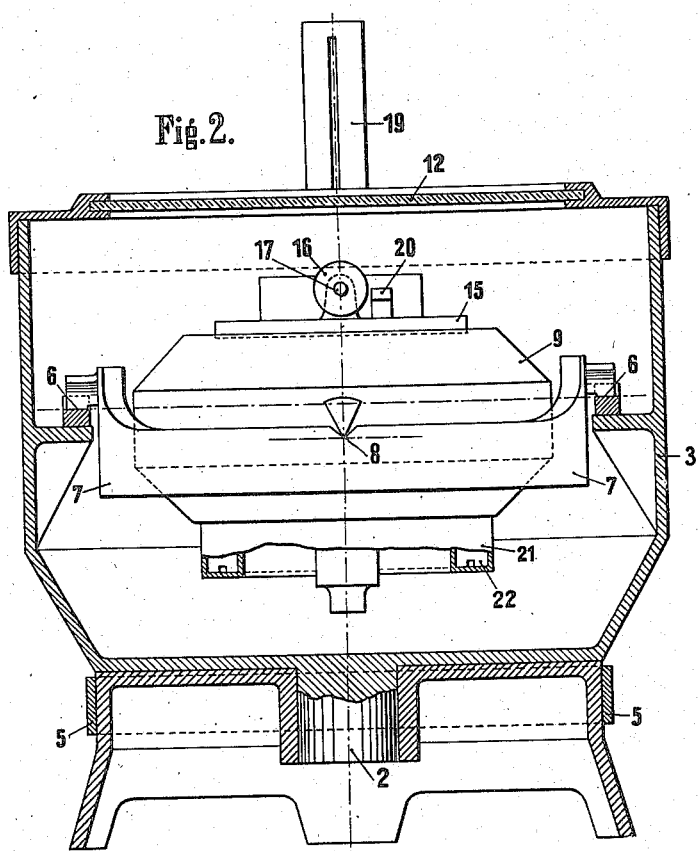
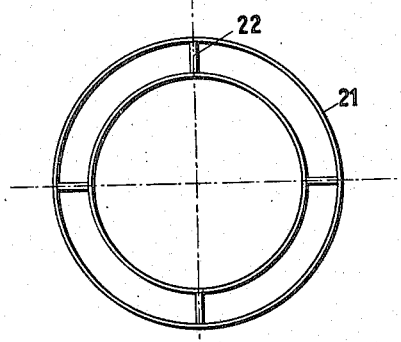

UNITED STATES PATENT OFFICE.

HERMANN ANSCHÜTZ-KAEMPFE, OF NEUMÜHLEN, NEAR KIEL, GERMANY.

ARTIFICIAL HORIZON.

1,141,099.  Specification of Letters Patent.  Patented June 1, 1915.

Application filed February 27, 1914. Serial No. 821,353.

*To all whom it may concern:*

Be it known that I, HERMANN ANSCHÜTZ-KAEMPFE, a subject of the Emperor of Germany, residing at Heikendorferweg 9, Neumühlen, near Kiel, Germany, have invented certain new and useful Improvements in Artificial Horizons, of which the following is a specification.

In order to determine in navigation the position of a ship, it is usual to measure the angle of elevation of heavenly bodies from the horizon. If the observation of the natural horizon is impossible, the so-called artificial horizon can be used. It consists generally of a reflecting surface of a liquid, but numerous experiments have already been made with gyroscopic apparatus in which the axis of rotation is vertical, and the center of gravity is in, or above, or below the line of support. A liquid mirror has the tendency to assume a position normal to the resultant of gravity and the acceleration pressure at the moment, so that it can be used only when the ship is perfectly still. Gyroscopic apparatus are less affected by the movements of ships, as a single acceleration pressure produces only a very slight oscillation, and acceleration pressures of opposite directions neutralize each other during a complete period of precession of the gyroscope. In order to insure the necessary accuracy, a long period of precession must be adopted, for which purpose the center of gravity must be brought as close to the point of support, as possible. In order to eliminate errors due to the precession, each observation must be repeated after a half period of precession. For that purpose, it is however desirable to have the shortest possible time of precession, which would necessitate the largest possible distance between the center of gravity and point of support. Apparatus hitherto known have the disadvantage that they comply only with one of these two contradictory conditions.

To avoid the difficulty in question, the artificial horizon is given, according to this invention, different degrees of accuracy, in two planes at a right angle to each other and arranged so that the plane of greatest accuracy can be turned in the direction of the heavenly body to be observed. In practical construction, this is attained by placing the two Cardan axes at different levels above the center of gravity, and by rotatably arranging the whole apparatus in such a manner that the Cardan axis nearest to the center of gravity, can always be brought into the direction of observation. The acceleration pressures acting with reference to the said axis, have therefore a short leverage, and consequently produce only a small precession movement. This movement takes place, in accordance with gyroscopic laws, about the Cardan axis which is normal to the direction of observation, that is to say, in the direction in which great accuracy is required. On the other hand, the moment of the forces acting at the center of gravity, about the axis normal to the direction of observation, is comparatively large so that the oscillations subside quickly, as desired for a quick succession of observations.

The artificial horizon according to this invention is further provided with a device by means of which the center of gravity of the movable apparatus can be shifted relatively to the gyroscopic axis. Owing to this movement of the center of gravity, the gyroscope is forced to effect a precession the magnitude and direction of which can be adjusted in such a manner that the gyroscopic axis which would have retained, in itself, its direction in space, participates in the movement of the earth and remains always normal to the surface of the earth. A similar device is described in the U. S. patent specification No. 877034.

The drawings show diagrammatically a construction according to this invention, Figures 1 and 2 being two cross-sections through the apparatus, at an angle 90° to each other. Fig. 3 is a plan, Fig. 4 detail view.

1 indicates a leg or stand which is secured at a suitable point of the ship or to a portable frame. In the said stand is rotatably mounted, by means of a cylindrical pin 2, a casing 3 preferably provided with an index 4 moving over a scale 5 secured to the stand 1, so that angular movements of the rotatable casing 3 relatively to the fixed stand 1 can be read at this point. In the casing 3 is rotatably supported about the axis 6—6, by means of cups and knife edges 6, a ring 7 which in its turn carries in cups and knife edges 8, an inclosed box 9 which can swing about the axis 8—8.

The suspension of the box 9 within the casing 3 is similar, as shown in Fig. 3, to an ordinary Cardan suspension, but differs from the latter—and this is an essential feature of the present invention—by the fact that the axis of rotation 6—6 does not intersect the axis of rotation 8—8. As will be seen in comparing Figs. 1 and 2, the two axes are, on the contrary, in different planes, so that the center of gravity of the box 9 and of the parts secured to the same, is only a little below the axis 8—8, but considerably farther below the axis 6—6 (for instance, two to ten times as far, according to the kind of ship and to the accuracy required). When the gyroscope is not rotating, the box 9 would therefore have a different time of oscillation about the axis 6—6 than during oscillation about the axis 8—8. The box 9 carries in ball bearings 10 and 11, the gyroscope 13 which is shown dotted in the drawing. It is kept permanently rotating by means of a motor of any desired kind. The motor is covered by the box and is therefore not visible in the drawing. The box 9 is further provided near its upper end with a mirror 14 which is mounted exactly at a right angle or normally to the axis of the gyroscope. Moreover, on the box 9 is rotatably mounted a ring 15 which forms a support for the regulating weight 16 by means of which the center of gravity of the system is moved out of the gyroscopic axis and the latter is forced to execute a precession compensating the motion of the rotation of the earth. The weight 16 is mounted by means of a screwthread on a screw 17 secured to the rotatable ring 15 and can be rotated thereon. Its position and its distance from the axis of the gyroscope 13 can be read on a scale 20. To the box 9 is further secured an annular vessel 21 shown in Figs. 1 and 2 partly in section. This vessel is partly filled with a liquid such as mercury, oil or the like, and contains further a number of partitions 22 provided at the bottom with small passage openings of adjustable size. The result of this arrangement is that the precession movements of the gyroscope about the vertical line are strongly damped if there is a considerable difference of phase between the precession movements of the gyroscopic axis and the movement of the liquid within the tube 21. According to the law of energy, a certain quantity of work or energy must be taken from the gyroscope in order to damp its precession. In the arrangement described the amount of energy required is consumed by the friction forces during the passage of the liquid through the narrow openings in the partitions 22. It must be pointed out that damping of oscillations of gyroscopic compasses about the horizontal axis, based on the same principles, is already well known, for instance from the U. S. patent-application Ser. No. 631699.

The box 9 with the gyroscope, mirror, regulating weight and damping vessel, which parts will be hereinafter referred to as the movable system, can be observed through a glass-plate 12 of the casing 3. The glass-plate 12 can however be removed during the said observation. Finally, the casing 3 is provided at the ends of a diameter with a sighting device of well known kind, consisting of a pin 18 and of a slotted plate 19.

The working of the device described is as follows:—Let it be first assumed that the center of gravity of the movable system is balanced so that the mirror is horizontal when the gyroscope is not rotating, and that the regulating weight is adjusted for the latitude of 90°. Let the gyroscope be then operated and its axis come to rest, after executing a few oscillations of quickly decreasing amplitude, into the vertical line of the place where the apparatus is mounted. Owing to daily rotation of the earth, the said vertical line is fixed only with reference to the earth, while it always experiences a greater or less angular rotation in the world space. This rotation of the vertical line is greatest at the Equator, and decreases in higher latitudes, and finally becomes zero at the pole. If the axis of the gyroscope is to make no movement relatively to the surface of the earth, it must execute a precession in space, the amount and direction of which must be equal to those of the rotation of the vertical line of the place where the apparatus is situated. To cause such a precession, a turning moment of given magnitude and direction must be exercised on the gyroscope, and this is done by an adjustable weight with one-sided action. U. S. patent specification No. 877034 describes a similar arrangement in which, under the action of a weight, a gyroscope participates in the rotation of the horizontal plane of the place, about the vertical line.

It is obvious that the movement of precession of the gyroscopic axis must always be toward the east. The weight must therefore be arranged on the north or south according to the direction of rotation of the gyroscope. In order that it may be arranged at any moment in this point of the compass, it is rotatably mounted on the box 9 by means of the ring 15. If the apparatus is brought to different latitudes, the magnitude of the turning momentum required alters. To that end, the weight can be shifted by means of the screw 17. In order to enable the weight to be conveniently adjusted, to the ring 15, next to the screw 17, is secured the scale 20, preferably having indications of latitude.

The casing 3 being rotatable in the stand 1, the whole apparatus to be adjusted, before the observations, with the assistance of the sighting device 18 and 19 in such a manner that the Cardan axis 8—8 coincides as exactly as possible with the direction of the heavenly body to be observed. As the center of gravity of the movable system, at which the acceleration pressure acts, is situated close under the axis in question, the disturbing influence of the said acceleration pressures is in that way kept as low as possible. Any desired acceleration pressure can be decomposed into three components at a right angle to each other; the vertical component does not cause any precessional movement, as long as the center of gravity of the movable system is exactly in the vertical axis of the system. One horizontal component, in the direction of the axis 8—8, produces, in accordance with gyroscopic laws, a canting of the mirror about the axis 8—8, and the third component, in the direction of the axis 6—6, a canting about the said axis. As already stated, the center of gravity of the movable system is only very little below the axis 8—8. The component of a pressure, which acts in the direction of the axis 6—6, and, if the gyroscope did not rotate, would turn it about 8—8 acts therefore on the gyroscope only with a correspondingly small leverage. The canting of the rotating gyroscope about the axis 6—6 thus produced, will therefore also remain very small and moreover will be so slow that the gyroscopes would be practically unaffected by pressures periodically altering their direction, such as for instance pitching. The matter is different with that component of any pressures, which acts in the direction of the axis 8—8 on the gyroscope. It engages with a larger leverage with the movable system and produces a greater oscillation of the same about the axis 8—8. The star to be observed being however situated, as already stated, in the direction of the axis 8—8, no essential error of measurement will be made, since only the cosine of the angle of error appears in the equation, provided that the rotation of the mirror about the axis 8—8 is not too great. In other words the mirror is given, by mounting the axes 6—6 and 8—8 at different levels, two different degrees of accuracy, namely a very great one in the direction of observation, and a smaller one in the direction at a right angle to the same, where inaccuracies are not so important. Owing to the center of gravity of the movable system being placed low in one plane, the period for the complete precession of the gyroscope will however be considerably reduced. In case of a rotating gyroscope it is equal to the geometrical mean of the time of oscillation that the gyroscope would have if the two Cardan axes were situated at the same level as 6—6, and of the time of oscillation if the two Cardan axes were at the level of the axis 8—8. The arrangement described therefore produces a gyroscope coming to rest comparatively quickly, without its accuracy being below that of a gyroscope coming to rest very slowly. The new arrangement has however a further important advantage. It is obvious that the adjustment of a pendulum in the vertical line will be the more accurate, the lower the center of gravity is under the point of suspension, as the friction at the knife edges or small errors of manufacture give then so much smaller angles of error. In the construction described, the center of gravity is much lower under the knife edges 6—6, than under the knife edges 8—8. The mirror will therefore remain more accurately normal to the knife edges 6—6 in the horizontal plane. This is however the direction in which the elevation of the object above the horizon is to be measured. Further, the advantage of a shorter time of oscillation compared to the well known constructions, will become more particularly noticeable owing to the above described damping device bringing the gyroscope to a standstill in the vertical line after a few oscillations. If the time for a complete oscillation of the gyroscope is short, the time from the starting of the motor to the moment when the apparatus is ready for working, will be much shorter than in the case of slowly oscillating gyroscopes.

Other arrangements could be made in place of the construction described in order to give the movable system, in accordance with the inventive idea, different times of oscillation relatively to the two Cardan axes. Thus, for instance, the Cardan axes could be arranged in the same plane, and the center of gravity of the movable system comparatively far below their point of intersection. The movable system can then be combined with a free liquid surface of suitable shape which would act exactly as if the center of gravity of the movable system were shifted higher relatively to a plane.

The knife edges 6—6 and 8—8 which, according to the foregoing description, have to carry the whole weight of the movable system, could also be relieved by a float immersed into a liquid, or the movable system itself could be formed in to a floating body and allowed to float on a liquid. The floating body would have to be given such a shape that the metacenter is considerably higher in the plane of the knife edges 8—8, than in the plane of the knife edges 6—6.

Another kind of damping could also be selected for damping the oscillations of the gyroscope. Thus for instance according to the U. S. patent application Ser. No. 768739, an auxiliary pendulum could be secured to the movable system, which pendulum, when the gyroscope oscillates away from the vertical, would release external turning moments about one of the Cardan axes, which would counteract the oscillations of the movable system.

What I claim is:

An artificial horizon comprising a movable system including a gyroscope having a normally vertical axis, suspension means for said system the axis of which is situated closely above the center of gravity of the movable system, and further suspension means the axis of which is at right angles to the axis of the first-mentioned suspension means and situated materially above the said center of gravity.

In witness whereof I have hereunto signed my name this sixteenth day of February 1914 in the presence of two subscribing witnesses.

DR. HERMANN ANSCHÜTZ-KAEMPFE.

Witnesses:
A. V. W. CORJE,
W. ROEDEN.